United States Patent [19]
Monroe

[11] Patent Number: 6,130,917
[45] Date of Patent: Oct. 10, 2000

[54] INSTANT PROTOCOL SELECTION SCHEME FOR ELECTRONIC DATA TRANSMISSION

[76] Inventor: David A. Monroe, P. O. Box 780907, San Antonio, Tex. 78278-0907

[21] Appl. No.: 08/816,399

[22] Filed: Mar. 14, 1997

[51] Int. Cl.[7] .................................................. H04C 27/12
[52] U.S. Cl. ........................... 375/295; 370/466; 370/467
[58] Field of Search ..................................... 370/465, 466, 370/467; 348/341, 441; 358/434, 435, 468; 395/500; 375/222, 219, 295

[56] References Cited

U.S. PATENT DOCUMENTS

| | | | |
|---|---|---|---|
| 4,677,611 | 6/1987 | Yanosy et al. | 370/401 |
| 5,182,748 | 1/1993 | Sakata et al. | 370/466 |
| 5,287,541 | 2/1994 | Davis et al. | 455/12.1 |
| 5,696,606 | 12/1997 | Sakayama et al. | 370/467 |
| 5,706,286 | 1/1998 | Reiman et al. | 370/467 |
| 5,818,603 | 3/1996 | Motoyama | 358/296 |

*Primary Examiner*—Wellington Chin
*Assistant Examiner*—Congvan Tran
*Attorney, Agent, or Firm*—Bracewell & Patterson

[57] ABSTRACT

The protocol scheme of a destination or receiving station is identified by a source or sending station in order to permit automatic reformatting of the source data into a compatible format and protocol scheme before transmission is initiated. The destination protocol is logged in the source system so that the protocol can thereafter be determined by destination address. The scheme is also capable of determining the protocol and format of the sending station, selecting the appropriate protocol and converting the data to a compatible format.

10 Claims, 5 Drawing Sheets

FIG. 4

DESTINATION INFO TABLE

| DESTINATION | DATA FORMAT | (PARAMETERS) | PROTOCOL | (PARAMETERS) |
|---|---|---|---|---|
| NAME 1 | FORMAT a | (PARAMETERS) | PROTOCOL x | (PARAMETERS) |
| NAME 2 | FORMAT b | (") | PROTOCOL y | (") |
| NAME 3 | FORMAT c | (") | PROTOCOL z | (") |
| NAME (N) | FORMAT (F) | (") | PROTOCOL (F) | (") |

INSTANT PROTOCOL SELECTION SCHEME FOR ELECTRONIC DATA TRANSMISSION

CROSS REFERENCE TO RELATED APPLICATION

This invention is specifically related to my co-pending application filed on even date herewith, entitled: "Method and Apparatus for Sending and Receiving Facsimile Transmissions via Distributive Networks", Ser. No. 08/815,026, and incorporated by reference herein.

BACKGROUND OF THE INVENTION

1. Field of the Invention

The subject invention is generally related to methods for transmitting and receiving data via electronic transmission, and is specifically directed to a method for selecting the proper receiving protocol for transmitting data generated at one station to a remote station of unknown protocol.

2. Discussion of the Prior Art

In recent years, the electronic creation and/or transmission and reception of data has exploded. The use of digital encoding, compression, transmission, decompression and decoding has made it possible to almost instantaneously transmit both visual and audio information to almost any location in the world. Examples of such applications include facsimile transmission of written or printed documents. For example, "fax" machines are now quite common, where an original document can be scanned and digitized, with the information representing the document being digitally transmitted of a phone line or the like to a compatible receiving "fax" machine at any location, simply by dialing the telephone address of the receiving machine. In the past, systems communicated only with like systems, using identical data formats and protocols at both the origination system and the destination system.

More recently, computer based systems have been used to convert various documents and data formats into a compatible format before transmission or to convert information, once received in one format to a desirable format at the receiving station. For example, it is now possible to create a document in Microsoft Word, or WordPerfect processing systems or the like and use on-board software to reformat the document into a Group III "fax" format without printing the document. The digitized document is converted into the proper format and transmitted via telephone line or other suitable transmission link to the receiving using the proper protocol station without having to first produce a hard document at the transmitting end. Likewise, documents may be "faxed" from a remote location to a receiving station and immediately converted into a suitable format, such as a MicroSoft Word or a WordPerfect format directly from the faxed data by using OCR techniques.

In such prior art systems, it is necessary to match the protocol and the data format used by both the transmitting station and the receiving station to assure they are compatible before the transmission begins. Typically, when the data source is a "fax" scanner and compression system, such as a Group III fax, and the receiving station is a compatible Group III fax machine, it is only necessary to dial the receiving Group III machine, and the data is transmitted, received, decoded, decompressed and printed as a hard document corresponding to the original document scanned at the transmitting station.

When the sending and receiving stations are of known but different types, a converter is required to place the data in the proper format for a receiving station before it can be transmitted. For example, if the file source is a digital camera for producing a digital visual image and it is desired to transmit data from the camera to a Group III fax machine, the raster video data produced by the camera will not be received by the Group III fax machine unless it is first reformatted in a Group III format then transmitted using the Group III fax protocol. While software is available to perform this task, there must be some intervention in the transmission process to first identify the format of the data and the protocol of the receiving station and then perform the proper conversion before transmission can take place.

As the use of electronic transmission becomes more widespread, and the variety of sending and receiving stations increases, it is not always possible to know in advance whether the sending and receiving stations are compatible. Further, it may be desirable to automatically send data to a plurality of stations which are not all using the same protocol and/or data formats.

Therefore, it is desirable to provide a method for automatically identifying a remote station protocol and performing proper conversion of data format before transmission is initiated.

SUMMARY OF THE INVENTION

The subject invention is directed to a unique protocol identification scheme where the protocol of a destination station is identified and incoming data is converted to the proper format for that station during the transmission process. The scheme is functional in both the sending and the receiving mode. This permits data in an initial or source format to be converted to a selected format compatible with the destination station by a system utilizing a conversion scheme adapted for reading and selecting the appropriate data format and protocol for converting the source data to a selected data format and protocol to be transmitted to any matching destination station. The transmitted data is then presented in the format and protocol of the destination station. The subject invention permits on-line, real time transmission regardless of data format and permits transmission of source data to a variety of stations using protocols of either the transmitting station or the receiving station.

The method of the subject invention is specifically adapted for transmitting source data generated at a source system formatted with a source format to a remote destination system which may require a different, incompatible data format. The destination protocol is determined, and the protocol schemes are matched. The compatibility of the source data format and the destination data format is determined. Where required, the source data is converted to a compatible data format, and transmission is initiated using a protocol compatible with the destination system.

The preferred embodiment of the subject invention first identifies the remote station by its telephone (or other electronic) address. Once contact is made, a protocol check is initiated, in the typical manner. The protocol of the remote system is then identified. Once identified, a handshake procedure is initiated in order to complete the connection between the sending and receiving stations. This assures that the stations stay on line. The protocols of the two systems are then compared, and if the data is compatible, transmission is initiated.

It is an important aspect of the present invention that if the protocols are not compatible with the data format, real time conversion of the data and transmission is initiated and completed while the systems remain on line.

It is an additional feature of the invention that once the particular protocol and data format for a specific address has been identified, the may be stored in a address store whereby the protocol and format is automatically identified each time that receiving address is selected. When this address is later again called, the system immediately knows what protocol and data format to expect and what data format is required when transmission is initiated and can initiate conversion prior to going on line. If the protocol has been changed for some reason and a handshake does not occur, the system will automatically fall back to the protocol check sequence and once the protocol is identified, the system will be automatically updated. It is also possible to manually enter various protocol schemes for specific addresses if such are known. The system of the present invention also permits operator intervention and selection of protocol and data format conversion schemes, where desired.

The system of the subject invention can also receive data from any of a plurality of sending stations, utilizing the same handshake, comparison and conversion scheme in reverse. That is, once the receiving station confirms the protocol of the incoming data, an on-line, real time instantaneous conversion of the incoming data takes place.

One significant advantage of the protocol selection method of the subject invention is that it permits transmission of source data to a plurality of stations regardless of the compatibility of the plurality of remote stations. That is, a source system having the data format scheme of the present invention may communicate with a plurality of remote stations, whether or not the remote stations can communicate with one another, by use of data conversion and the proper protocol.

The present invention greatly increases the flexibility of data transmission between remote stations and permits ready transmission of data from a file source without being protocol dependent. This greatly facilitates the transmission and reception of data without having a complete history of the receiving station at the operator's disposal prior to initiation of transmission.

A particularly useful adaptation is the incorporation of the method and apparatus of the subject invention in combination with my co-pending application filed on even date herewith, entitled: "Method and Apparatus for Sending and Receiving Facsimile Transmissions via Distributive Networks", Ser. No.: 08/815,026, and incorporated by reference herein. As therein described, information is sent rand received via an "universal interface" permitting data to be transmitted between a computer workstation to a facsimile machine via a telephone line, a hardwired system, a LAN or a WAN or any other distributive network. Likewise, the system permits transmission between any combination of telephone, computer, facsimile machine, or sending transmission device with any receiving device. The adaptability of the system therein described is greatly enhanced when used in combination with the protocol selection scheme of the subject application.

It is, therefore, and object and feature of the subject invention to provide a method for electronically transmitting source data to a remote station regardless of the compatibility of the source file and the receiving station.

It is another object and feature of the subject invention to provide a method for receiving data from a remote station regardless of the data format of the remote station.

It is yet another object and feature of the subject invention to provide a method for determining the protocol scheme of a remote station and initiating data conversion to a compatible scheme before transmission is initiated.

Other objects and features of the invention will be readily apparent from the accompanying drawings and detailed description of the preferred embodiment.

BRIEF DESCRIPTION OF THE DRAWINGS

FIG. 4 illustrates a typical conversion library configuration.

DETAILED DESCRIPTION OF THE PREFERRED EMBODIMENTS

Figure 1:
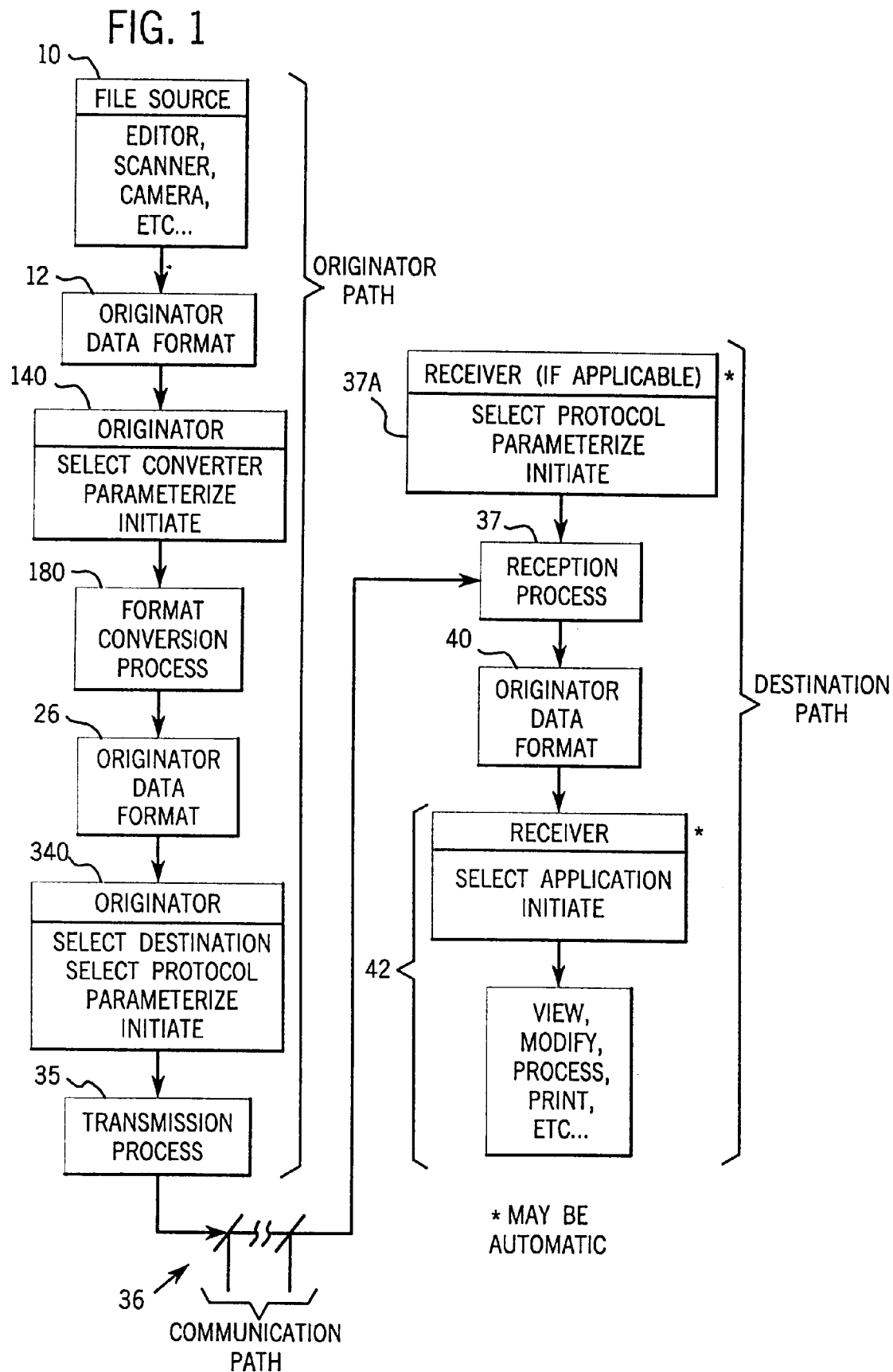
FIG. 1 is a basic flow diagram showing protocol and format conversion and selection at a transmitting system for transmission to a selected receiving station.

The flow chart illustrating the primary features of the method of the subject invention is shown in FIG. 1, a file source 10, which may be a word processor, an editor system, a scanner, a video camera or still camera, an audio signal generator or the like, provides original data which is to be transmitted. FIG. 1 is a streamlined flow chart showing transmission of file source data to a destination system where the source data is incompatible with the source, where the operator may intervene to select the conversion parameter. The original data is formatted in the manner well known to those skilled in the art, as indicated at 12. For example, a camera may present the raster video data compressed to a JPEG format. As is also typical, an originator or initiator operator may intervene as indicated at 140 to select a destination and initiate a send sequence. As will be further described, this could also be an automated send sequence without departing from the scope and spirit of the subject invention.

As illustrated by step 140, once a destination station is selected, the system selects the proper conversion technique and initiates conversion parameters, wherein the conversion process is completed as shown at 180 to reconfigure the data at 12 in a destination data format 26. The originator then selects the destination and the protocol compatible with the selected destination, as shown at 340. Once this step is completed, the transmission process is initiated at 35 via a typical communication path 36, such as, by way of example, LAN, WAN, telephone line or other distributive network system. The receiver station then is set at the proper protocol parameters (if applicable) or may in many cases be a fixed protocol scheme, as indicated at 37A. The reception process is initiated as soon as an incoming signal is detected on path 36, as illustrated at 37, with the data being received in the destination format, as indicated at 40, for sending to the receiver 42 for processing.

Figure 2:
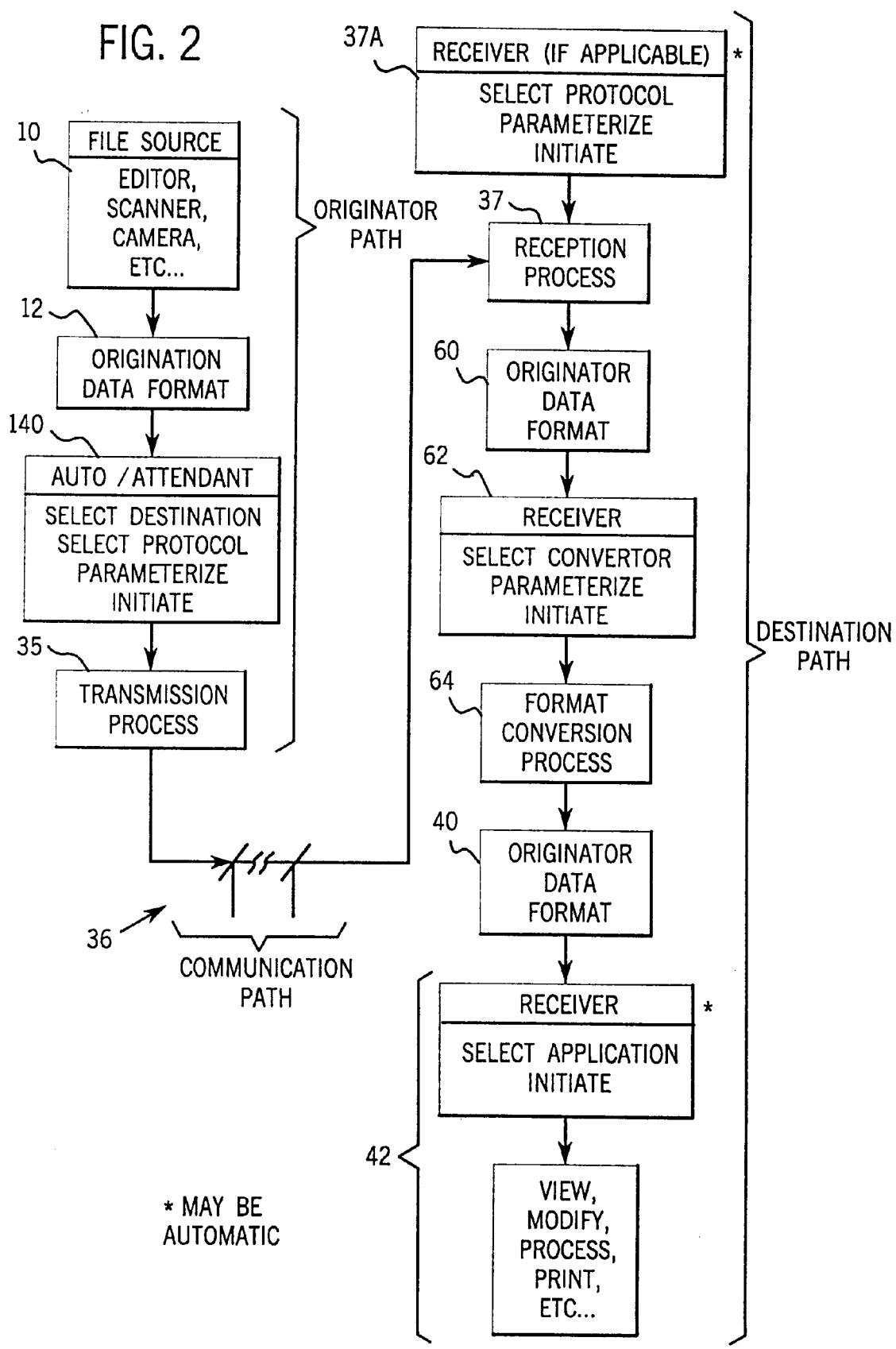
FIG. 2 is a basic flow diagram showing protocol and format conversion and selection at a receiving station for reception of incoming data from a selected transmitting station.

The subject invention also contemplates conversion at the receiving station, as indicated in FIG. 2. This permits a single "universal" station to be utilized with any of a variety of sending or receiving units. With specific reference to FIG. 2, it will be noted that a selected sending or originating unit will have a data file source 10 in a dedicated format which is identified, as before, as the origination data format 12. The system then selects the destination and protocol (which may be dictated by the sending unit) as indicated at 140, after-which transmission is initiated as indicated at 35 for transmission via the communication path 36 to a receiving station. The receiver station now initiates the reception process as before, and as indicated at 37 and 37A. Using the technique of the subject invention, the origination data format is determined at 60, and the receiver initiates the conversion process at 62 for converting the data to the receiving station configuration at 64 for presenting the data in the destination data format at 40 for processing in typical fashion as indicated at 42.

Figure 3:
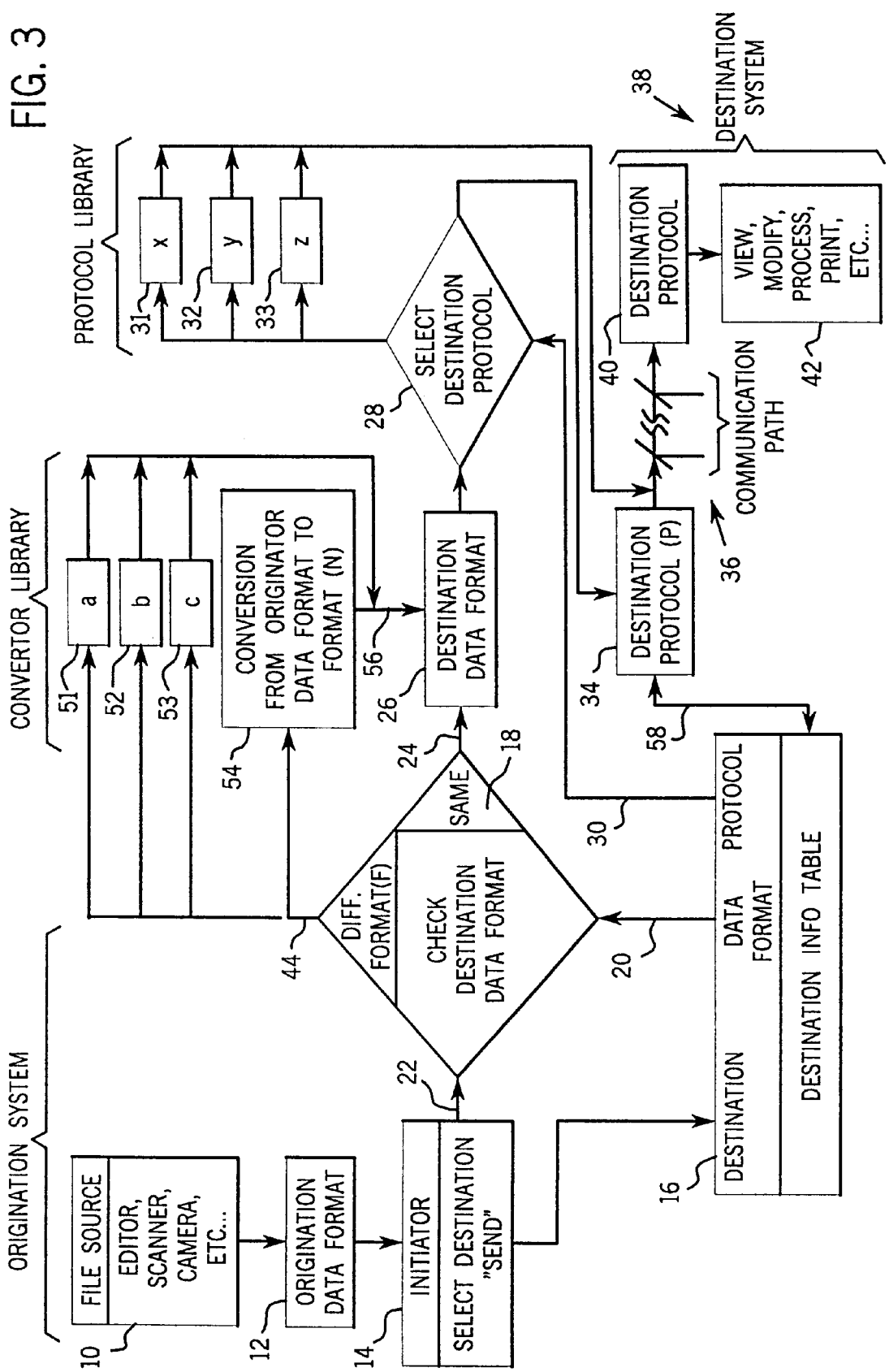
FIG. 3 is a flow diagram of the subject invention, showing a file origination system, the protocol scheme of the invention and a destination system, utilizing a conversion library for automated conversion.
Figure 5:
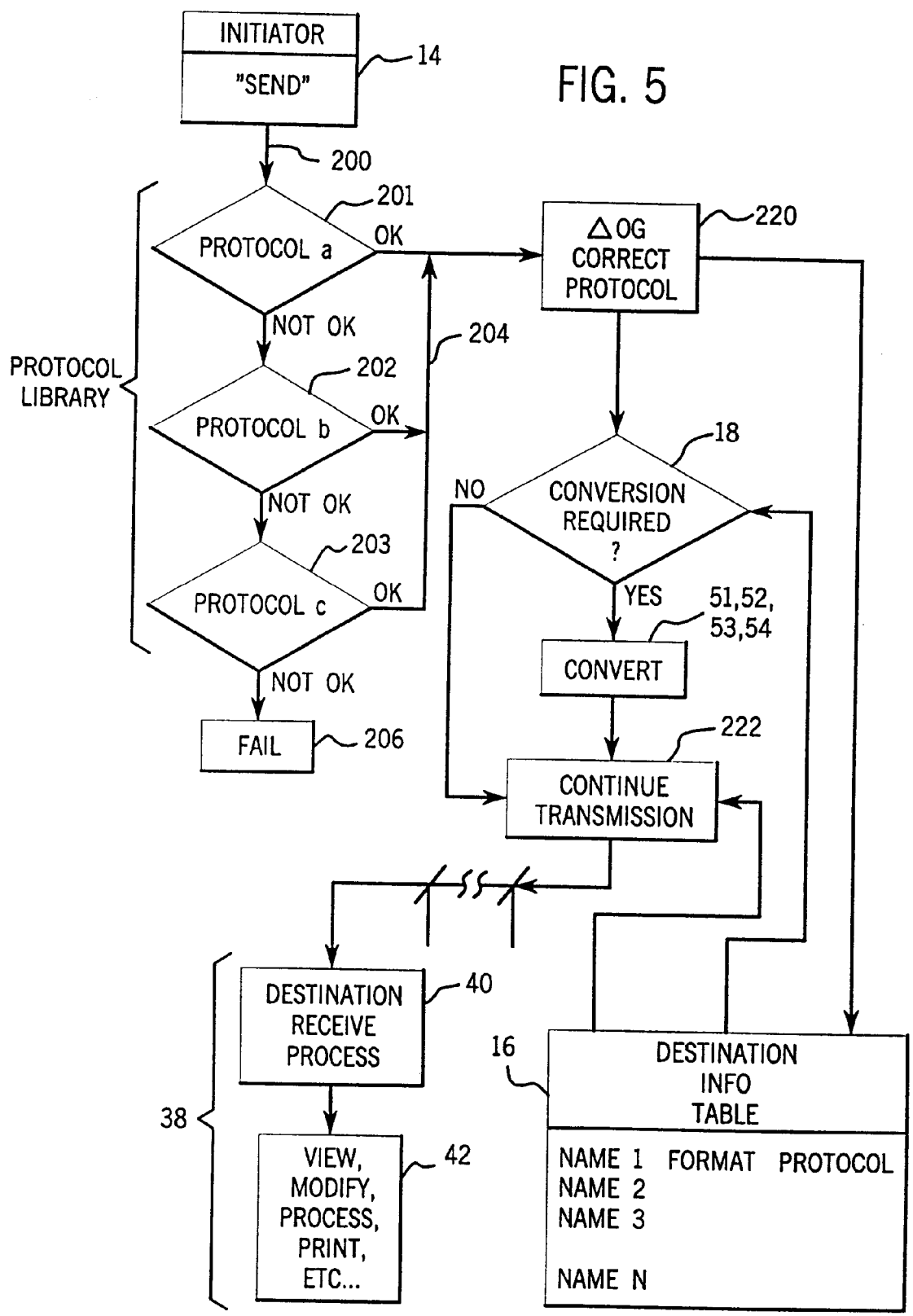
FIG. 5 is a flow chart illustrating the use of a protocol library for determining the destination type in accordance with the method of the subject invention.

As shown in FIGS. 3–5, the data conversion is initiated automatically in order to permit conversion of incoming or outgoing data to provide universal transmission of data over the system. In the preferred embodiment of the invention, upon selection of the destination, a destination protocol sequence check is initiated by initializing the destination information data base 16, see FIG. 3. Based on the destination selected, the destination data base 16 will identify the appropriate protocol which is pre-loaded in the system and introduce this information in the compare network 18, as indicated at 20. At the same time the data is introduced into the compare network 18, as indicated at 22. If the destination protocol and the data protocol are determined to be compatible, the data is released as indicated at 24, in the original format as indicated at 26. This initializes the destination protocol selection and sequencing as indicated at 28, with appropriate parameters being introduced from the destination protocol database 16, as indicated at 30. The appropriate destination protocol and parameters are then selected from the protocol library, as indicated at 31–34. A typical destination information table or library is illustrated in FIG. 4, and includes an recognizable name or address for the destination such as a telephone number or E-mail address or the like, the data format for that destination and the proper protocol parameters. It will be readily understood that the number of protocol options in the protocol library is a matter of choice.

Once the protocol has been selected, the destination is contacted through a typical communication path 36, such as a telephone line or the like, and the destination system 38 is initialized in the normal manner to "handshake" with the transmitting system and identify appropriate protocol and parameters as at 40, after which transmission begins and the data is entered into the destination system as at 42.

When the data format introduced into the compare network 18 via path 20 for a particular selected destination is not compatible with the source data on path 22, the compare network initializes a conversion sequence as indicated at 44. Based on the format introduced on 20 from the data base 16, the appropriate conversion sequence 51–54 is run, converting the source data to the appropriate format. The converted, re-formatted source data is introduced via path 56, and the transmission sequence continues from point 26 as described above.

In the event the initiator selects a destination at 14 which is not already stored in the data base 16, a "no data" signal is introduced into the compare network 18 via path 20. The source data is then not released into the transmission system and a connect sequence is started via a signal generated on path 58. This completes the connection with the destination system 38, and where possible, determines the proper protocol during the "handshake" sequence. Once the proper protocol is identified, the data base 16 is updated and the appropriate compare signal is released via path 20 into the compare network 18, and the sequence continues as previously described.

The destination data base 16 may include all appropriate protocol parameters for each destination address, such as, by way of example, whether the parameters are synchronous or asynchronous, start-stop sequencing, sync patterns, telephone number(s), I/O address router information, passwords where applicable, and the like. The data base may also include data format parameters such as resolution, size requirements, encoding options, compression options, embedded sync options, gamma, control character sets and the like. This permits full formatting of the source data before the data is transmitted.

An important advantage of the invention is readily apparent when the operator selects more than one destination at 14. If all selected destinations are compatible, once the source data is properly formatted, at 28, all destinations may be sequentially accessed by a single initiation sequence. If the destinations are not compatible, the source data is formatted first for the first selected destination and all compatible destinations. Once transmission is completed, the data is reformatted and a second transmission is initialized and completed. This process is repeated until the data has been properly formatted and transmitted to all selected destinations.

The automatic protocol and format determination scheme for sending documents to a receiving station of unknown protocol is shown in more detail in FIG. 5. As there shown, once the initiator or operator initiates the send sequence at 14, see FIG. 3, the protocol of the source data is introduced at 200 into a protocol check scheme which is loaded with a protocol library 210 which includes all of the available compatible protocols with the receiving system. The system tries stored available protocols for the receiving system, as indicated at 201–203, and if a match is determined, the data is released via 204 into a log table 220. If a match is not found, the system fails as at 206 and the transmission is interrupted and shut down.

Once the compatible protocol is determined and logged in, this information is placed in the data base. Thus, once the protocol for a new specific receiving system is identified, it is stored and future transmissions can be properly formatted before connection is initiated. Based on the determined destination protocol, the data format is determined by the table. If data format conversion (51–54) is needed, the process is executed and transmission is continued as indicated at 222. Once the conversion is completed, the transmission is continued as at 222, for transmitting the re-formatted source data to a destination station 38, as described relative to FIG. 1 above.

The method of the subject invention greatly enhances the versatility and efficiency of electronic data transfer schemes since it eliminates protocol and data format dependency. It also greatly improves transmission techniques by automatically determining remote protocols and reformatting the data without having prior indication of the incompatible format and protocol.

While certain embodiments and features of the invention have been described in detail herein, it will be readily understood that the invention encompasses all modifications and enhancements with the scope and spirit of the following claims.

What is claimed is:

1. A method for transmitting source data generated at a source system formatted with a source data format and protocol to a remote destination system which may require a different, incompatible protocol, the method comprising the steps of:

a. determining at the transmitting source the destination protocol;

b. checking the compatibility of the source data and the requirements for the destination data;

c. converting at the transmitting source the source data to a compatible data for the remote destination system if the source data and the requirements for the destination data are not compatible; and d. initiating transmission of the converted source data in the compatible protocol requirements.

2. The method of claim 1, including the step of logging the destination protocol in the source system once the destination protocol is determined.

3. The method of claim 2, further including the step of using the log to select data format and transmission.

4. The method of claim 3, further including the step of updating the log automatically if the use of the logged information does not permit transmission.

5. The method of claim 3, further including the step of automatically determining the data format and protocol of the destination station when no compatible entry is present in the log.

6. The method of claim 3, wherein the logging steps includes creating a data base at the source system wherein the data base identifies the destination protocol by the destination address.

7. The method of claim 6, wherein the data base includes the electronic address for the destination system, and the protocol, format and parameters for the destination system.

8. The method of claim 7, wherein the data base includes a password for the destination system.

9. The method of claim 1, further including the step of initiating a send signal to the destination system between steps "a" and "b", and further including the step of interrupting transmission between steps "b" and "c" only if either or both of the following conditions are present:

a. the source and the destination protocol are incompatible; and/or b. the source data and the destination data are incompatible.

10. The method of claim 1, further including a protocol library and the method including the step of making a protocol decision for the destination system based on the protocol library.

* * * * *